US012772968B2

(12) United States Patent
Klarmann

(10) Patent No.: US 12,772,968 B2
(45) Date of Patent: Oct. 27, 2026

(54) ROD TIP PROTECTOR DEVICE

(71) Applicant: MORfishing Products, LLC, Stuart, FL (US)

(72) Inventor: James Klarmann, Stuart, FL (US)

(73) Assignee: MORFISHING PRODUCTS, LLC, Stuart, FL (US)

( * ) Notice: Subject to any disclaimer, the term of this patent is extended or adjusted under 35 U.S.C. 154(b) by 0 days.

(21) Appl. No.: 19/181,431

(22) Filed: Apr. 17, 2025

(65) Prior Publication Data

US 2026/0248119 A1 Aug. 27, 2026

Related U.S. Application Data

(60) Provisional application No. 63/764,553, filed on Feb. 27, 2025.

(51) Int. Cl.
*A01K 97/10* (2006.01)
*B60R 7/06* (2006.01)

(52) U.S. Cl.
CPC ................ *A01K 97/10* (2013.01); *B60R 7/06* (2013.01)

(58) Field of Classification Search
CPC .................................. A01K 97/10; B60R 7/06
See application file for complete search history.

(56) References Cited

U.S. PATENT DOCUMENTS

| | | | | |
|---|---|---|---|---|
| 3,903,633 | A * | 9/1975 | Hutcherson | A01K 97/10 43/17 |
| 4,216,604 | A | 8/1980 | Starke | |
| 4,261,129 | A | 4/1981 | Ohmura | |
| 4,765,083 | A * | 8/1988 | Wilkins | A01K 97/08 43/26 |
| D373,271 | S * | 9/1996 | Rosh | D6/706 |
| 5,860,573 | A * | 1/1999 | Hossack | B60R 7/14 211/89.01 |
| 8,393,111 | B1 * | 3/2013 | Johnson | A01K 97/10 43/21.2 |
| 8,904,699 | B2 * | 12/2014 | Fraser | A01K 97/08 43/25 |
| 10,227,049 | B2 * | 3/2019 | Beznes | A01K 97/08 |
| 10,638,738 | B1 * | 5/2020 | Stevenson | A01K 87/025 |
| 2015/0327529 | A1 * | 11/2015 | Zimmerman | A01K 99/00 43/54.1 |
| 2019/0223424 | A1 * | 7/2019 | Moses | A47F 7/0035 |

FOREIGN PATENT DOCUMENTS

| | | |
|---|---|---|
| JP | 2004329027 | 11/2004 |
| KR | 101064293 B1 | 9/2011 |

* cited by examiner

*Primary Examiner* — Kimberly S Berona
*Assistant Examiner* — Steven J Shur
(74) *Attorney, Agent, or Firm* — McHale & Slavin, P.A.

(57) ABSTRACT

A dashboard mounted fishing rod tip holder comprising a body in the form of a caricature having an inner cavity accessible through an opening. The opening is framed by a serrated edge replicating teeth and configured to securely position a fishing rod tip. A cushioning element within the cavity is constructed to hold at least one rod tip in position. The cushioning element is preferably flexible bristles to ensure that the rod tips remain separated, preventing damage to the tips or the vehicle during transport. The device is designed for coupling to a vehicle dashboard without marring the dashboard providing a protective solution for use while transporting fishing rods. When the device is not in use as a rod holder, the caricature body is a decorative item for concealing rod tip holder function.

9 Claims, 5 Drawing Sheets

ROD TIP PROTECTOR DEVICE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/764,553, entitled "FISHING ROD TIP PROTECTOR FOR VEHICLE INTERIOR", filed Feb. 27, 2025. The contents of the above referenced application is incorporated herein by reference in its entirety.

FIELD OF THE INVENTION

The invention is directed to the field of recreational and sport fishing and, in particular, to a fishing rod tip protector device that resides on the dashboard of a vehicle for use in protecting rod tips during transportation.

BACKGROUND OF THE INVENTION

Fishing represent a significant financial rods investment, as their cost is influenced by material selection, intricate manufacturing techniques, brand prestige, and specialized performance features. High-end rods undergo advanced production processes, such as precision layering of composite materials and resin infusion, to optimize strength, sensitivity, and flexibility. Many premium models incorporate titanium or ceramic line guides to minimize friction and enhance durability. Whether crafted from traditional fiberglass or high-performance materials like carbon fiber, graphite, or high-modulus composites, these rods require careful handling. Damage during use or transportation can lead to rapid failure, making proper care essential to protect this valuable investment.

When it comes to fishing rods, one size does not fit all. Fishing rods are meticulously designed for sensitivity allowing anglers to detect even the subtlest bites across various fishing conditions. The rod tip, in particular, is typically engineered to register bites at different depths to target a wide range of species. For instance, high-performance saltwater rods are tailored for extreme deep-drop fishing (1,000-1, 800 feet) to sense bites from swordfish and other abyssal species, while moderate deep-drop rods (600-1,000 feet) are built for yellowedge grouper and barrelfish. Shallow deep-drop rods (400-600 feet) cater to queen snapper snowy grouper, whereas reef fishing rods (50-300 feet) are optimized for snapper, grouper, and hogfish. Surface trolling rods (0-100 feet) are essential for targeting open-water species like mahi-mahi, wahoo, tuna, and kingfish. Freshwater fishing rods also vary in sensitivity and strength, accommodating everything from powerful walleye, pike, and musky to smaller species like trout, perch, and crappie. Additionally, casting rods are engineered for greater accuracy, power, and durability-qualities that often command a higher price. With such a vast array of fishing styles and specialized rods, investing in the right equipment can be costly. As a professional fishing guide, the need to protect this investment by handling rods with care, not only protects my investment but also my livelihood. Transporting rods in a vehicle must account for various rods expected to be used as improper transport can lead to damage, ultimately shortening the lifespan of these precision-engineered rods.

Entry-level fishing rods require just as much care, if not more, than high-end models. The use of less expensive materials can make these rods easily susceptible to damage during transportation. For many, especially children, an entry-level rod serves as their first introduction to fishing. A broken or damaged rod can quickly turn an exciting day on the water into a disappointing experience, emphasizing the importance of proper handling to ensure longevity and enjoyment.

Within the fishing community, transporting rods inside a vehicle presents a common challenge. Travel is often necessary to gain access to the water, but travel also increases the risk of rod damage as well as potential safety hazards. Fishing rods are long enough where they need to be placed over the seats of a vehicle with the rod tips extending to over the dashboard. Unsecured rod tips can mar the dashboard and strike the windshield when quickly stopping the vehicle. Making a fast turn can cause the rod tips to slide across the dashboard causing a safety distraction for the vehicle passenger and/or driver.

What is needed in the art is a fishing rod protector that engages the vehicle dashboard and secures rod tips for the safety of the vehicle passengers and protects the fishing rod tips by use of a protector device concealed within a caricature shape.

PRIOR ART REFERENCES

Korean Patent No. 101064293B1 discloses a fishing rod tip protector having an inlet hole in one end with an impact absorber formed in the other end. The protector body is tube shaped.

US Publication 20150327529 discloses a device used for transporting a fishing rod wherein the device includes a clamp configured to engage the fishing rod and an enclosure connected to the clamp and configured to accept the end of the fishing rod and a hook. An enclosure may include a first side and second side connected together via a hinge and which may be closed together and locked via a locking mechanism.

U.S. Pat. No. 4,261,129 discloses a protector for guides of a telescopic rod which comprises a resilient cylindrical member with its one end being closed, a hook member provided at its closed end and an opening notched longitudinally along the cylindrical member. The hook member so designed to serves as a hanger of telescopic fishing rods for display and to serve as a shock absorber during transportation.

Japanese Patent 2004329027 discloses a protecting tool for the rod tip of a fishing rod having an enclosure with a holding hole passing from a tip end face to a rear end face in the press fitting direction and elastically fitting onto the rod tip is formed in an elastic cap that is press fitted into one end opening of a cylindrical protecting cover for covering the tip side of the rod tip of the fishing rod and a slot part permitting fitting of the rod tip into the holding hole formed longitudinally from the tip end face to the rear end face in the outer peripheral surface of the elastic cap U.S. Pat. No. 8,904,699 discloses a tool to protect fishing rods and reels from damage, whether the equipment is in storage or transit. The tool includes a hollow, tubular storage chamber having one open end for inserting an end of a fishing rod therein. The storage chamber may include a buoyant material at a closed end thereof. A flexible strap extends from the open end of the storage chamber to run along the length of the fishing rod. An adjustable loop at the end of the flexible strap is adapted to loop around the reel end of the rod and can be held in place by the reel.

U.S. Pat. No. 4,216,604 discloses a fishing rod tip guard formed from a plastic case with a hinged top into which the tip is placed in an interior slot and the top closed and fastened. The slot prevents the guard from slipping off the tip.

U.S. Pat. No. 10,638,738 discloses a fishing rod scabbard having a plurality of segments connected in an end-to-end manner to achieve a desired length from a wide variety of scabbard length possibilities. Each segment has a similar cross-sectional geometry and a bumper connector that enables end-to-end engagement between adjacent segments. A sleeved, tubular ramped passageway in longitudinal axial alignment with the tubular passageways of adjacent segments allows storage and transport of a fishing rod having a reel, bait, hook, and tackle on the pole.

U.S. Pat. No. 10,227,049 discloses a two piece fishing rod storage assembly designed to be mounted on an automobile roof rack. The rear assembly is installed on the rear roof rack crossbar and the front assembly is installed on the front roof rack crossbar. The rear assembly is comprised of a plurality of hollow tube sections connected to each other, running parallel to each other, and longitudinally with the automobile.

U.S. Pat. No. 4,765,083 discloses a fishing line holder which cuts a fishing line removing a fishing lure and engages the fishing line leading to the rod and reel. The fishing line holder forms a cavity so that when the fishing line is reeled in, the tip of the fishing rod is accepted into the fishing line holder so that the tip of the rod is protected.

The known prior art has several drawbacks including: strap-down rod holders only secure rods by awkwardly wrapping around small-diameter shafts; overhead rod fixtures require front-to-back positioning, restricting the size of rods that can be stored; most existing fixtures must be fastened to the vehicle interior using penetrating fasteners; some vehicles, such as leased or rental cars, cannot accommodate screws or permanent modifications; many existing fixtures require bands or straps, adding an inconvenient and cumbersome step to securing the rods; fixtures that rely on elastic or Velcro® straps degrade over time due to UV exposure and heat, making them unreliable in harsh conditions.

SUMMARY OF THE INVENTION

A dashboard-mounted fishing rod tip holder disguised as a caricature having an inner cavity accessible for holding multiple fishing rod tips. The inner cavity is accessible through an opening that is framed with a serrated edge that resembles triangular shaped shark teeth. A fishing rod is securely positioned by the serrated edge for transit. A cushioning element lines the cavity and is specifically constructed to isolate one rod tip from an adjoining rod tip placed in the cavity, and hold the rod tip in position. The body is designed for a dashboard using either a friction enhancing surface or a non-damaging fastener such as hook and loop, providing an efficient and protective solution for storing fishing rods. When not in use as a rod tip protector device is in the form of a caricature, such as a shark, providing a decorative item that conceals the rod holder function.

An objective of the invention is to provide a fishing rod tip protector for a vehicle that protects fishing rod tips during transit. The protector can be placed at any angle necessary inside vehicle interior, including straight, diagonal, angled, or inclined.

Another objective of the invention is to provide a fishing rod tip protector for a vehicle that has a no-slip nature to the material, eliminating the need for a penetrating fastener fixation.

Still another objective of the invention is to provide a fishing rod tip protector for a vehicle that encloses rod tips without the need for straps, bands, or clamps.

Another objective of the invention is to provide a fishing rod tip protector for a vehicle that no rigid components, reducing the risk of injury during a collision.

Still another objective of the invention is to provide a fishing rod tip protector for a vehicle that separates rod tips among themselves, reducing vibration and entanglement of tips.

Another objective of the invention is to provide a fishing rod tip protector for a vehicle that eliminates the need to unstrap when removing all rods, even all at once as the rod tips are maintained in position.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

A detailed embodiment of the instant invention is disclosed herein; however, it is to be understood that the disclosed embodiment is merely exemplary of the invention and the caricature may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

The present invention relates to a vehicle dashboard mounted fishing rod tip holder designed to securely hold fishing rod tips in a vehicle, preventing damage and providing convenient storage. The device is to secure fishing rod tips, single or multiple, during transport within a vehicle interior. The device conceals a rod tip protector to prevent rods from moving around freely inside the vehicle yet remain easy to remove the fishing rods when ready.

Figure 1:
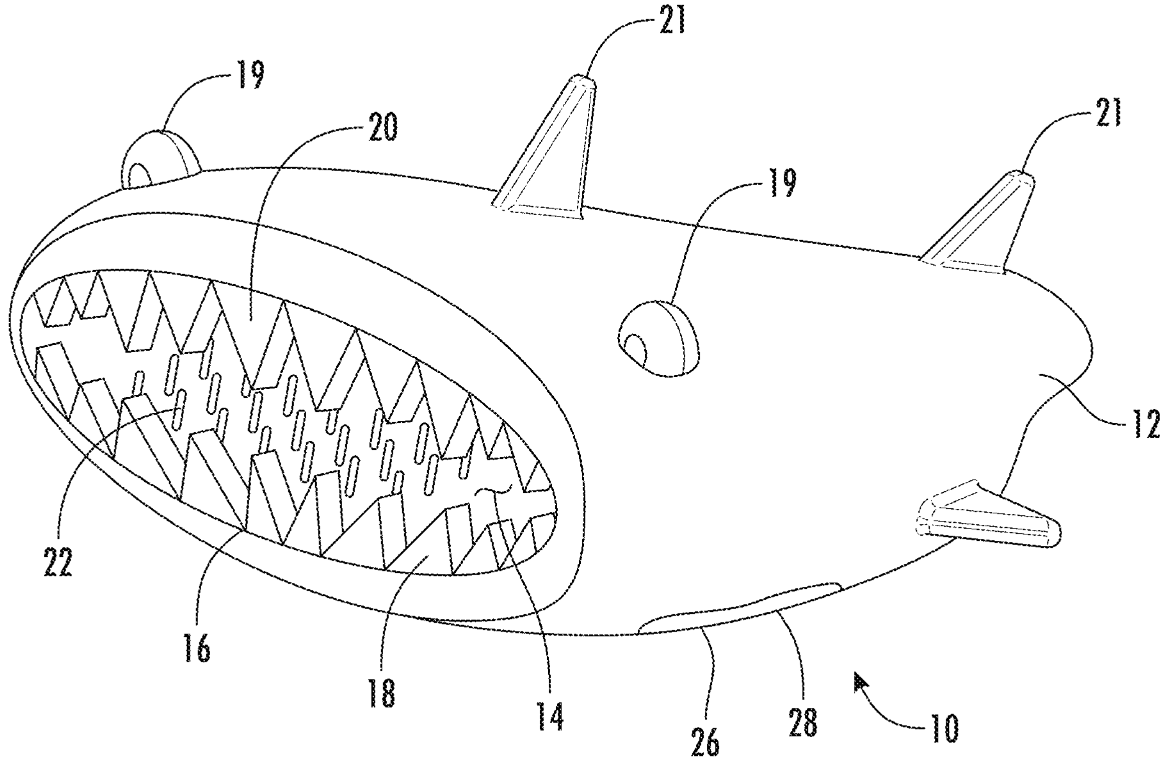
FIG. 1 is an isometric image of the shark body.
Figure 2:
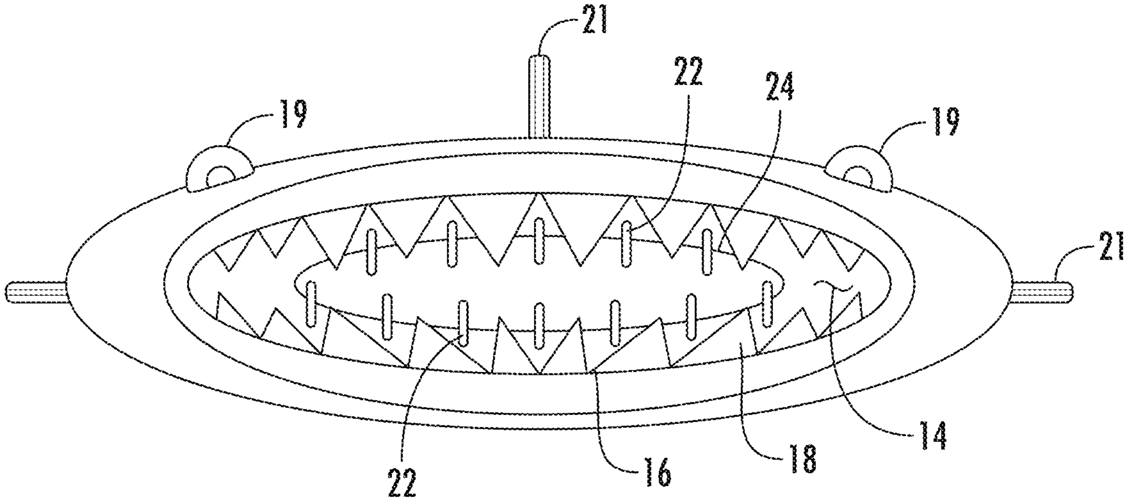
FIG. 2 is a front view thereof.
Figure 3:
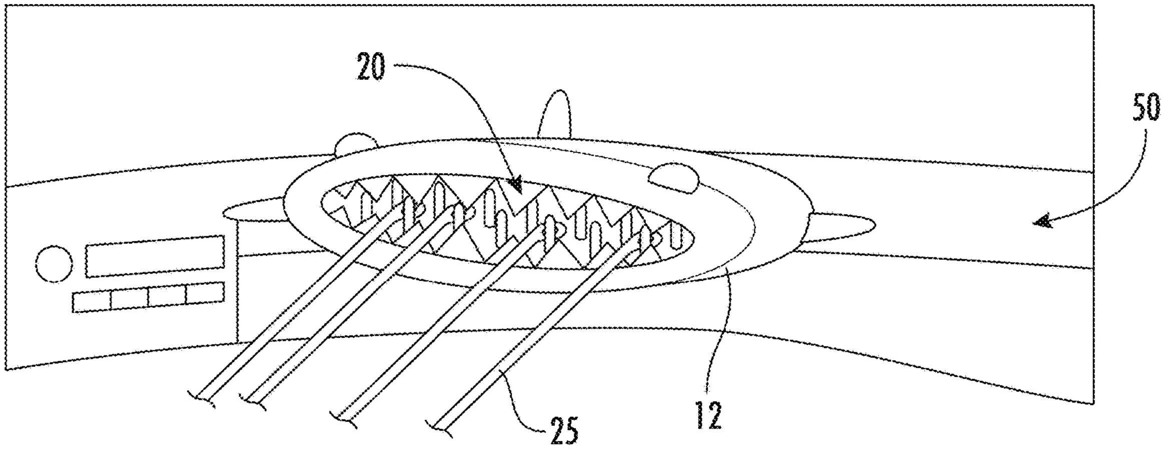
FIG. 3 is a pictorial view of the device placed on the vehicle's interior.
Figure 4:
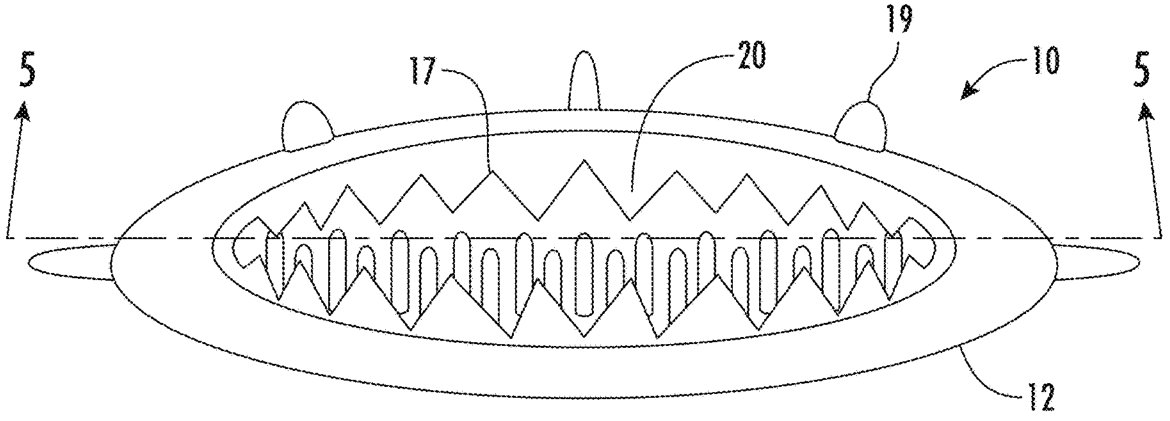
FIG. 4 is a front view of the main body assembled with bristles.
Figure 5:
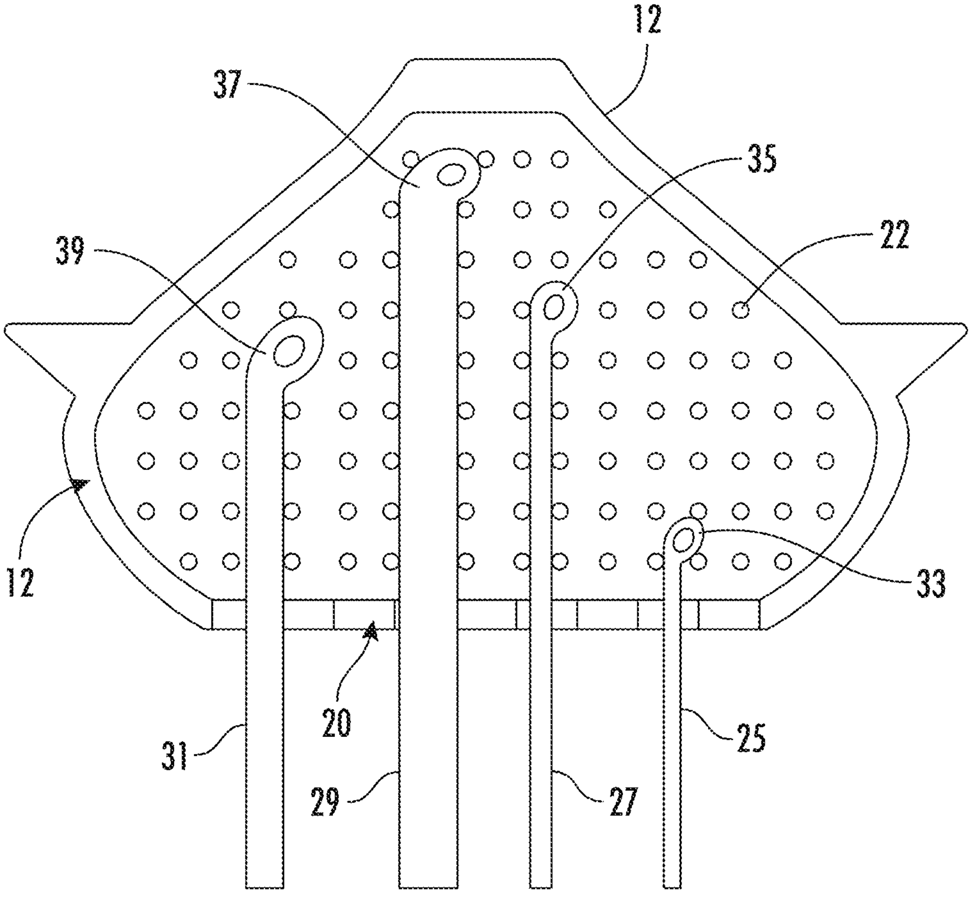
FIG. 5 is a cross sectional view of FIG. 4 illustrating the body cavity.
Figure 6:
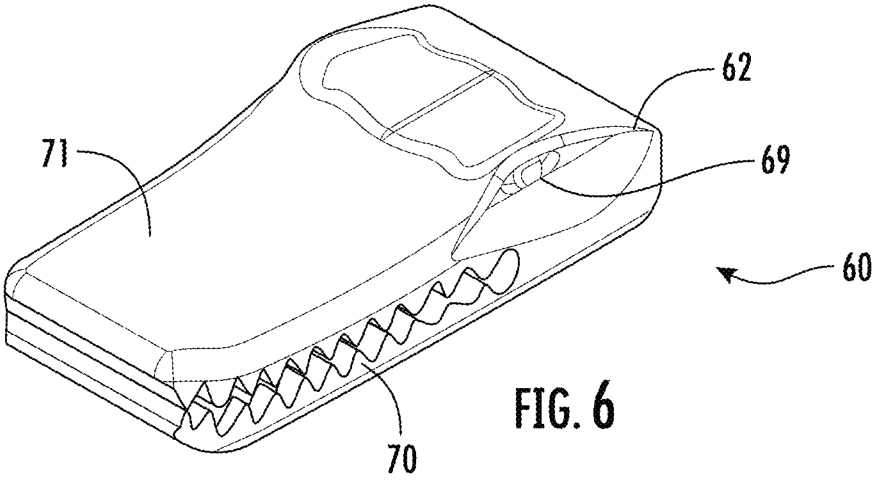
FIG. 6 is an isometric image of alligator body.
Figure 7:
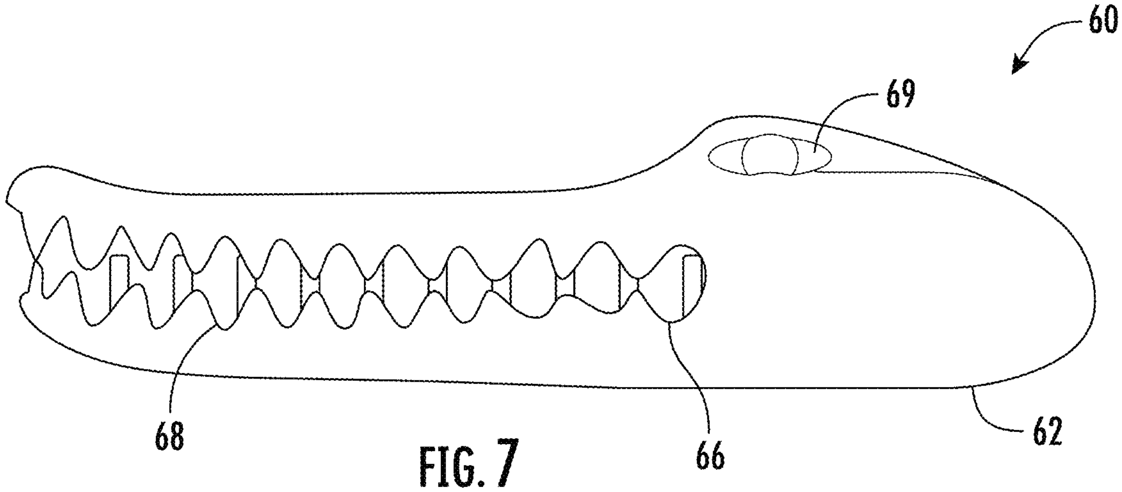
FIG. 7 is a front view thereof.

Referring to FIGS. 1-7, the fishing rod tip holder 10 includes a body 12 that forms an inner cavity 14. The inner cavity 14 is accessible through an enlarged opening 16 in the body 12 constructed and arranged to accommodate multiple fishing rod tips. The opening 16 is framed by a serrated edge 18 that is configured to position rods tips as providing by the illustration of elements 25, 27, 29 and 31. The serrated edge 18 is constructed with tooth-like projections 20 that form a V-shape receptacle 17 at the root of the tooth, and are sized to effectively hold the rods in a predetermined position ensuring rod tips, depicted by elements 33, 35, 37, and 39, are spaced apart. The body of the device is wide, flexible, and is strong enough to provide a stable, distributed placement onto the vehicle's interior dashboard surface. Designed with a wide opening for maximum insertion area as depicted in the FIG.'s using the shark caricature. The device can be made wide enough to hold other sports equipment as well, such as boat paddles, surfboard tips, and the like items transported in a vehicle. In the illustrated embodiment, a shark caricature is depicted wherein the shark body 12 has a mouth 16 with teeth 20, eyes 19, fins 21, and a tail 23.

A cushioning element 22 lines the inner cavity 14 of the holder 10. The cushioning element 22 serves multiple purposes including isolating one rod tip from any adjoining rod tip placed in the cavity, and preventing the rod tips from making contact with each other. In the preferred embodiment, the cushioning element is constructed of a plurality of soft polymer bristles 24. These bristles 24 are capable of absorbing impact forces and preventing any scratching or damage to the fishing rod tip. The bristles also help to securely hold the rod tip in place while cushioning it from potential shocks or vibrations during vehicle travel. Designed with surface and internal partitions for separation of individual rod tips, which can be holes, "teeth," bristles, or any other partition. The body is designed with some flexibility to prevent damage to the tip or vehicle interior. The opening will constrain the rod tip in up, down, left, right, and forward directions.

The body 12 and the serrated edge 18 are constructed of a non-marring rubber-based material. This material is selected from a group consisting of thermoplastic rubber, polyurethane, or silicone rubber. These materials are chosen for their durability, flexibility, and non-marring properties, ensuring that the fishing rods are held securely without being scratched or damaged.

The base 26 of the body 12 may include a friction-inducing surface 28 to hold the device securely to a vehicle's dashboard 50. This friction surface ensures that the holder stays in place during travel, even when the vehicle experiences quick stops.

In an alternate embodiment, the base 26 may include an adhesive backing for attachment to the vehicle dashboard. The adhesive backing offers an alternative attachment method for users who prefer a more permanent mounting solution. A mechanical fastening system (not shown) could offer flexibility in adjusting the holder's position. Alternatively, another embodiment is to include a suction cup attached to the body and releasably securable to a dashboard. To ensure longevity and prevent degradation from extended exposure to sunlight due to the direct mounting to a vehicle dashboard, the body 12 of the holder is integrated with a UV-resistant material. This feature makes the holder durable and suitable for use in a variety of environmental conditions without the risk of the material breaking down over time.

The body 12 is in the form of caricature, with the enlarged serrated edge 18 framing the opening 16 to resemble a shark's mouth filled with teeth 20. This design enhances the aesthetic appeal of the fishing rod tip holder wherein the device may be left on the dashboard even when no rod tip protection is required. Specifically, the shark caricature 30 adds a fun and visually distinctive element to the device while maintaining its functional attributes. The opening can be depicted as a "Fun Creatures Mouth" or any other mock opening such as a shark, alligator, hockey puck, cave opening, or the like caricature.

Figure 8:
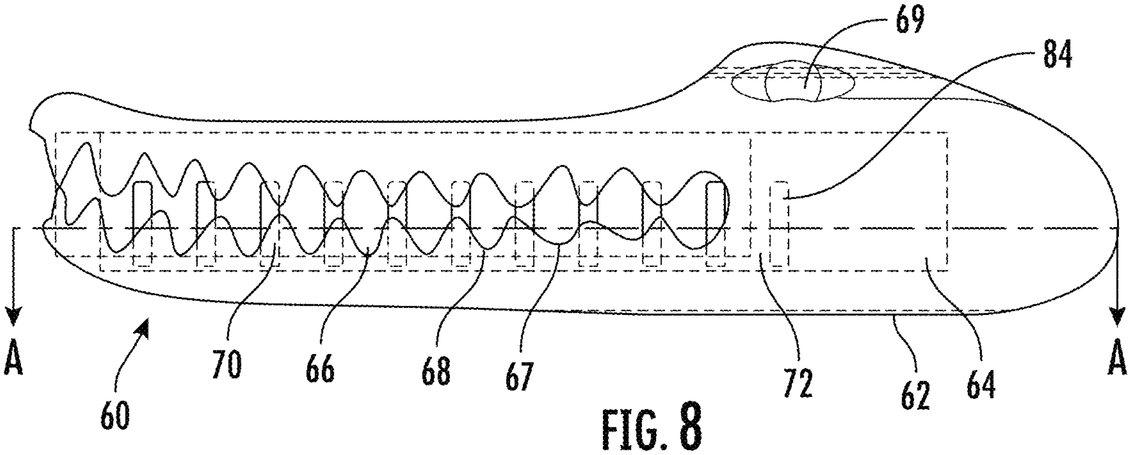
FIG. 8 is a cross sectional view thereof.
Figure 9:
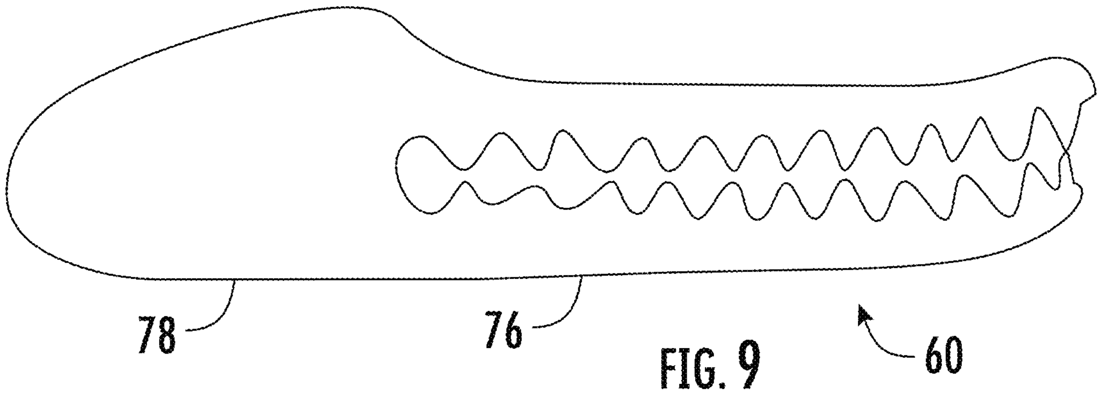
FIG. 9 is a plane back view thereof.
Figure 10:
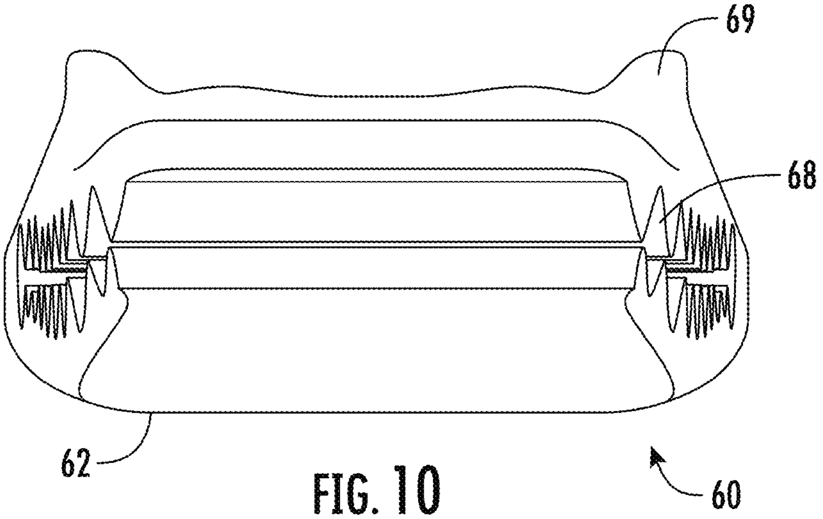
FIG. 10 is a left side view thereof.
Figure 11:
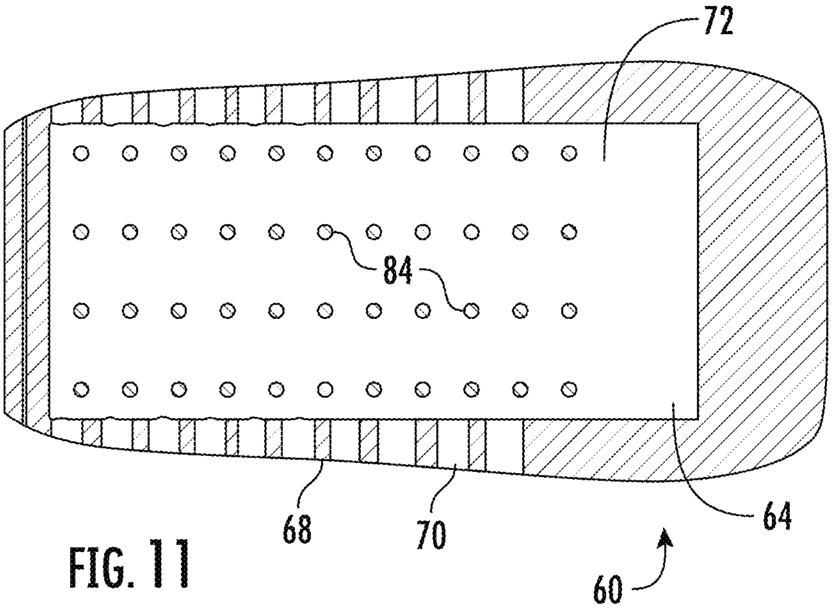
FIG. 11 is cross sectional top view thereof.

Referring to FIG. 6-11, the fishing rod tip holder 60 includes a body 62 that forms an inner cavity 64. The inner cavity 64 is accessible through an enlarged opening 66 in the body 62 constructed and arranged to accommodate multiple fishing rod tips. The opening 66 is framed by a serrated edge 68 that is configured to position rods tips in a similar format set forth in the first embodiment. The serrated edge 68 is constructed with tooth-like projections 70 that form a V-shape receptacle 67 at the root of the tooth, and are sized to effectively hold the rods in a predetermined position. The body of the device is wide, flexible, and is strong enough to provide a stable, distributed placement onto the vehicle's interior dashboard surface. Designed with a wide opening for maximum insertion area as depicted in the FIG.'s using the alligator caricature. The device can be made wide enough to hold other sports equipment as well, such as boat paddles, surfboard tips, and the like items transported in a vehicle. In the illustrated embodiment, a alligator caricature is depicted wherein the body 62 has a mouth with teeth, eyes 69 and snout 71.

A cushioning element 72 lines the inner cavity 64 of the holder 60. The cushioning element 72 serves multiple purposes including isolating one rod tip from any adjoining rod tip placed in the cavity, and preventing the rod tips from making contact with each other. In the preferred embodiment, the cushioning element is constructed of a plurality of soft polymer bristles 84. These bristles 84 are capable of absorbing impact forces and preventing any scratching or damage to the fishing rod tip. The bristles also help to securely hold the rod tip in place while cushioning it from potential shocks or vibrations during vehicle travel. Designed with surface and internal partitions for separation of individual rod tips, which can be holes, "teeth," bristles, or any other partition. The 62 body is designed with some flexibility to prevent damage to the tip or vehicle interior. The opening 66 will constrain the rod tip in up, down, left, right, and forward directions.

The body 62 and the serrated edge 68 are constructed of a non-marring rubber-based material. This material is selected from a group consisting of thermoplastic rubber, polyurethane, or silicone rubber. These materials are chosen for their durability, flexibility, and non-marring properties, ensuring that the fishing rods are held securely without being scratched or damaged.

The base 76 of the body 12 may include a friction-inducing surface 78 to hold the device securely to a vehicle's dashboard. In an alternate embodiment, the base 76 may include an adhesive backing for attachment, mechanical fastening, or include a suction cup attached to the body and releasably securable to a dashboard. To ensure longevity and prevent degradation from extended exposure to sunlight due to the direct mounting to a vehicle dashboard, the body 62 is integrated with a UV-resistant material.

The body 62 is in the form of caricature, with the enlarged serrated edge 68 framing the opening 66 to resemble an alligator's mouth filled with teeth 70. This design enhances the aesthetic appeal of the fishing rod tip holder wherein the device may be left on the dashboard even when no rod tip protection is required. Specifically, the shark caricature 60 adds a fun and visually distinctive element to the device while maintaining its functional attributes.

All patents and publications mentioned in this specification are indicative of the levels of those skilled in the art to which the invention pertains. It is to be understood that while a certain form of the invention is illustrated, it is not to be limited to the specific shape or arrangement herein described and shown. It will be apparent to those skilled in the art that various changes may be made without departing from the scope of the invention, and the invention is not to be considered limited to what is shown and described in the specification and any drawings/figures included herein.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features.

What is claimed is:

1. A vehicle dashboard mounted fishing rod tip holder comprising:

a body having an exterior in the shape of a caricature forming an inner cavity configured to receive a plurality of fishing rod tips, said inner cavity being accessible through an opening formed in said body;

a serrated edge positioned along at least portion of said opening, said serrated edge being configured to frictionally engage and retain at least one fishing rod tip extending into said inner cavity;

cushioning element positioned within said inner cavity, said cushioning element being constructed and arranged to separately support and isolate adjacent fishing rod tips positioned within said inner cavity; and base associated with said body said base including friction-inducing surface configured to removably secure said body to a vehicle dashboard;

wherein said serrated edge and said cushioning element cooperate retain the plurality of fishing rod tips in spaced-apart relation within said inner cavity during vehicle transit without the use of straps, clamps, penetrating fasteners.

2. The fishing rod tip holder of claim 1, wherein said body and said serrated edge are constructed of a non-marring rubber based material.

3. The fishing rod tip holder of claim 1, wherein said serrated edge is shaped into tooth-like projections with each tooth providing a V-shape receptacle to hold a rod in a predetermined position.

4. The fishing rod tip holder of claim 2, wherein said non-marring rubber based material is selected from the group consisting of thermoplastic rubber, polyurethane, or silicone rubber.

5. The fishing rod tip holder of claim 1, wherein said cushioning element includes a plurality of soft polymer bristles configured to absorb impact and prevent scratching or damage to a fishing rod tip.

6. The fishing rod tip holder of claim 1, wherein said base includes an adhesive backing or a mechanical fastening system for attachment to said vehicle dashboard.

7. The fishing rod tip holder of claim 1, wherein said body is integrated with a UV-resistant material to prevent degradation from sun exposure.

8. The fishing rod tip holder of claim 1, wherein said caricature is a shark with an enlarged serrated edge framing forming a mouth filled with teeth.

9. The fishing rod tip holder of claim 1, wherein said caricature is an alligator with an enlarged serrated edge framing forming a mouth filled with teeth.

* * * * *